A. C. PAULSMEIER.
AUTOMATIC DRAIN AND OILING SYSTEM FOR DEEP WELL PUMPS.
APPLICATION FILED MAY 12, 1914.
1,164,012.
Patented Dec. 14, 1915.
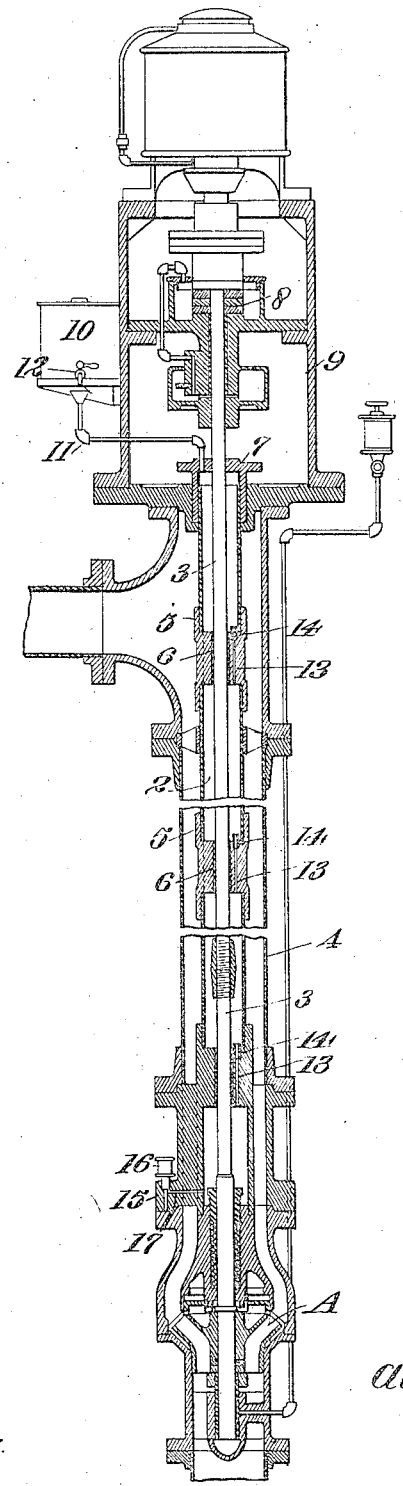
WITNESSES:
INVENTOR
Albert C. Paulsmeier.

UNITED STATES PATENT OFFICE.

ALBERT C. PAULSMEIER, OF ALAMEDA, CALIFORNIA, ASSIGNOR TO BYRON JACKSON IRON WORKS, OF SAN FRANCISCO, CALIFORNIA, A CORPORATION OF CALIFORNIA.

AUTOMATIC DRAIN AND OILING SYSTEM FOR DEEP-WELL PUMPS.

1,164,012.  Specification of Letters Patent.  Patented Dec. 14, 1915.

Application filed May 12, 1914. Serial No. 838,104.

*To all whom it may concern:*

Be it known that I, ALBERT C. PAULSMEIER, a citizen of the United States, residing at Alameda, in the county of Alameda and State of California, have invented new and useful Improvements in Automatic Drain and Oiling Systems for Deep-Well Pumps, of which the following is a specification.

This invention relates to an automatic drain and oiling system for deep well pumps.

It is one of the objects of the present invention to provide a gravity feed lubricating system, which is so constructed and connected with a deep well pump that an oil trap or pocket will be formed at the upper end of each bearing within the shaft tube of the pump, thus insuring a liberal supply of lubricant at each bearing.

Another object of the invention is to provide a draining system, in connection with the shaft tube of the pump, by which all leakage water and used or superfluous oil may be automatically discharged.

Further objects will hereinafter appear.

The invention consists of the parts and the construction and combination of parts as hereinafter more fully described and claimed, having reference to the accompanying drawing, in which the figure is a vertical central section of a deep well pump showing the application of the invention.

Referring to the drawing, A indicates a deep well pump of the centrifugal type, 2 the discharge pipe, 3 the pump shaft revolved by any suitable means (not here shown), and 4 the shaft tube in which tube couplings 5 and bearings 6 are mounted. The upper end of the shaft is provided with a tube gland 7 and a thrust bearing 8 of the usual construction. The pump, tube and shaft, with connected parts, are otherwise supported in the usual manner by an annular housing, indicated at 9. Suitably supported on one side of the housing is an oil reservoir or tank 10, and connecting said tank with the tube gland 7 is a pipe 11 having a controlling valve 12.

Suitably formed in each bearing is an oil duct or passage 13, and secured in the upper end of each duct is a pipe nipple 14 which extends a slight distance above the upper end of each bearing to form a trap to trap a predetermined quantity of oil. The duct 13, with the connected nipple 14, forms a drainage passage between each bearing and is provided for the purpose of carrying the overflow of oil from one bearing down to the succeeding bearing, etc. Suitably secured upon the drain flange 15 of the pump is a suitable form of check-valve 16 and forming a communication between the check-valve and the oil duct 13, in the lower shaft bearing, is a passage 17.

The operation of the lubricating part of the system will be as follows: Valve 12 is opened a sufficient distance to give the required feed or drip of oil. This is conveyed by the pipe 11 to the tube gland 7, which is mounted on the upper end of the shaft tube. The oil is here permitted to drain down through the inner section of the tube and will consequently accumulate on top of the upper shaft bearing 13 until a sufficient amount has collected to overflow through the nipple 14. The overflow oil is thus permitted to escape through the nipple 14 and the duct 13 and will consequently drain down through the second section or column of the shaft tube where it will again collect on the upper side of the second bearing. The oil is thus collected and conveyed from one bearing to another down through the several tube sections and bearings and is finally allowed to escape through the duct 13 in the lower shaft bearing and drain toward the check-valve 16. The provision of the nipples 14, with relation to the oil ducts in the shaft bearings, causes the oil to collect or become trapped at the upper end of each bearing. A liberal supply of lubricant is thus maintained above each bearing.

A considerable amount of water may accumulate within the shaft tube while the pump is remaining inactive, the water level in the well and tube being the same. But starting the pump and lowering the well water level causes a corresponding and automatic reduction of the water level within the tube until the well water level has been reduced below the position of the check-valve 16. The leakage water is thus automatically drained and discharged from the pump through the valve 16 the moment the water level within the well has become sufficiently lowered to uncover the valve. Perfect lubrication is assured at all times.

Having thus described my invention, what

I claim and desire to secure by Letters Patent is—

1. In a centrifugal pump, the combination with the shaft, of a tube inclosing same, bearings for the shaft at intervals in the tube, an oil passage in each bearing, a nipple secured in each oil passage projecting above the upper end of each bearing whereby a predetermined quantity of oil is trapped above each bearing and the surplus flows through said nipple and passage to successive bearings below, an oil reservoir connected with the upper end of the shaft inclosing tube, and a check-valve connected with the lower end of said tube through which leakage water may discharge.

2. In combination with a centrifugal pump and its shaft, a member inclosing the shaft, a plurality of bearings for the shaft at intervals in the member each formed to allow flow of oil successively from the upper to the lower bearings, means for delivering oil to the upper end of said member, and automatic means to allow leakage water to discharge from the lower end of said member.

3. In combination with a centrifugal pump and its shaft, means inclosing the shaft, means to feed oil to the inclosing means, means to intercept the fed oil and to apply same to the shaft and automatic means to discharge leakage water from the lower end of said inclosing means.

4. In combination with a centrifugal pump and its shaft, inclosing means for the shaft, a plurality of bearings for the shaft arranged at intervals in the inclosing means and each formed to trap a predetermined quantity of oil so as to retain the shaft submerged at each of said plurality of bearings and to feed the excess to the next lowest bearing, and automatic means adjacent the lowermost bearing to allow leakage water and superfluous oil to discharge from said member.

5. In combination with a centrifugal pump and its shaft, inclosing means for the shaft, lubricating means for the shaft arranged at intervals in the inclosing means and each formed to retain a predetermined quantity of oil and to feed the excess to the next lowest bearing, and means for automatically discharging excess oil from the bottom of said inclosing means during the pump operation whereby to allow complete control of the several quantities of oil within said inclosing means.

In testimony whereof I have hereunto set my hand in the presence of two subscribing witnesses.

ALBERT C. PAULSMEIER.

Witnesses:
  H. J. ELLEN,
  E. L. OSBORN.